(12) United States Patent
Hortlund et al.

(10) Patent No.: US 6,290,282 B1
(45) Date of Patent: Sep. 18, 2001

(54) STRUCTURAL BEAM FOR SUPPORTING AND REINFORCING A STRUCTURE

(75) Inventors: Stefan Hortlund, Auburn Hills, MI (US); Lars Sandberg, Luleå (SE)

(73) Assignee: Plannja Hardtech AB, Lulea (SE)

( * ) Notice: Subject to any disclaimer, the term of this patent is extended or adjusted under 35 U.S.C. 154(b) by 0 days.

(21) Appl. No.: 09/164,848

(22) Filed: Oct. 1, 1998

Related U.S. Application Data

(63) Continuation-in-part of application No. PCT/SE97/00535, filed on Mar. 26, 1997.

(30) Foreign Application Priority Data

Apr. 1, 1996 (SE) .................................................. 9601246

(51) Int. Cl.⁷ ......................................................... B60J 5/00
(52) U.S. Cl. ...................... 296/146.6; 296/188; 296/189; 52/735.1; 52/737.6; 49/502
(58) Field of Search ................. 296/146.6, 188, 296/189; 52/735.1, 737.6; 49/502

(56) References Cited

U.S. PATENT DOCUMENTS

| | | | | |
|---|---|---|---|---|
| 813,175 | * | 2/1906 | Schaaf et al. ....................... | 296/146.6 |
| 5,370,437 | * | 12/1994 | Alberda ............................... | 296/146.6 |
| 5,466,032 | * | 11/1995 | Clausen et al. .................... | 296/146.6 |
| 5,544,930 | * | 8/1996 | Stedman ............................. | 296/146.6 |
| 5,573,297 | * | 11/1996 | DeRees et al. .................... | 296/146.6 |
| 5,580,120 | * | 12/1996 | Nees et al. ......................... | 296/146.6 |
| 5,600,931 | * | 2/1997 | Jonsson ............................. | 296/146.6 |
| 5,756,167 | * | 5/1998 | Tamura et al. .................... | 296/146.6 |
| 5,785,376 | * | 7/1998 | Nees et al. ......................... | 296/146.6 |
| 5,800,007 | * | 9/1998 | Cho ................................... | 296/146.6 |
| 5,813,718 | * | 9/1998 | Masuda et al. .................... | 296/146.6 |
| 5,813,719 | * | 9/1998 | Kowalski .......................... | 296/146.6 |
| 5,820,202 | * | 10/1998 | Ju ...................................... | 296/146.6 |
| 5,887,938 | * | 3/1999 | Topker et al. ..................... | 296/146.6 |
| 5,992,922 | * | 11/1999 | Harbig et al. ..................... | 296/146.6 |
| 6,096,403 | * | 8/2000 | Wycech ............................. | 296/146.6 |

FOREIGN PATENT DOCUMENTS 0685355   12/1995   (EP) .

* cited by examiner

*Primary Examiner*—Joseph D. Pape
*Assistant Examiner*—Kiran B. Patel
(74) *Attorney, Agent, or Firm*—Nils H. Ljungman & Associates

(57) ABSTRACT

A safety bar which provides protection, the bar having a generally trapezoidal, open cross-sectional shape. The cross-sectional configuration of the bar includes a central flange which is embraced by two webs each of which has a side-flange which extends outwardly on a respective side of the bar. The bar has an intermediate section between a first section thereof and a mounting section thereof at one of its ends. In the intermediate section, the central flange has generally a decreasing width and the webs a generally decreasing height towards the bar end.

9 Claims, 2 Drawing Sheets

STRUCTURAL BEAM FOR SUPPORTING AND REINFORCING A STRUCTURE

CONTINUING APPLICATION DATA

This application is a Continuation-In-Part application of International Application No. PCT/SE97/00535, filed on Mar. 26, 1997, which claims priority from Sweden Patent Application No. 9601246-3, filed on Apr. 1, 1996. International Application No. PCT/SE97/00535 was pending as of the filing date of the above-icted application. The U.S. was an elected state in International Application No. PCT/SE97/00535.

BACKGROUND OF THE INVENTION

1. Field of the Invention

The present invention relates to a safety bar which provides protection, the bar having a generally trapezoidal, open cross-sectional shape. The cross-sectional configuration of the bar includes a central flange which is embraced by two webs each of which has a side-flange which extends outwardly on a respective side of the bar. The bar has an intermediate section between a first section thereof and a mounting section thereof at one of its ends. In the intermediate section, the central flange has generally a decreasing width and the webs a generally decreasing height towards the bar end.

2. Background Information

Safety bars are known from various applications. A common application is the use as barriers along highways and roads to prevent vehicles from running off the road in the event of accidents.

A known safety bar is known from Swedish Patent Specification SE-C-501812. As described in that patent specification, the safety bar has an open cross-section which results in low production costs and also in lower costs for corrosion protection and the like at the same time as it results in a good energy absorbing capacity in relation to the weight of the bar. The safety bar according to the present invention is an improvement of the safety bar described in SE-C-501812 and similar safety bars.

OBJECT OF THE INVENTION

The object of the present invention is to provide a bar structure which has a generally trapezoidal, preferably open cross-section and which has a higher energy absorbing capacity than for example the safety bar according to SE-C-501812.

SUMMARY OF THE INVENTION

The cross-section of the safety bar according to the present invention comprises a central flange which is embraced by two webs with outwardly directed side flanges. The bar has an intermediate section between a first section and a mounting section at one end of the beam, and towards the bar end, the central flange has generally a decreasing width and the webs generally a decreasing height. The inventive safety bar may include a first section of constant cross-section located in the centre part of the bar, from which the bar tapers outwardly towards both its ends. It lies within the purview of the invention, however, to omit this central first section, in which case the bar will taper towards its respective ends directly from the midway point of the bar. A one-sided bar lies also within the purview of the invention, by which is meant a bar which tapers from a larger cross-section out towards a narrower cross-section, or tapers asymmetrically, towards respective ends thereof. The intermediate section can be divided into section parts. The central flange can for example in a first part of the intermediate section have its width considerably reduced while the height of the webs is not reduced at all or reduced at a smaller extent, whereas the height of the webs can be reduced considerably in a second part of the intermediate section, while the width of the central flange is reduced at a smaller extent or not at all. It is advantageous to have the second part of the intermediate section located between the first part and the bar end.

The central flange may have a central channel that can be shallow or deep. The central channel can, for example, extend down to the plane through the side flanges. The cross-section of the bar need not be directly trapezoidal with sharp corners but may be somewhat rounded.

The safety beam according to the present invention is characterized in that the central flange extends substantially through the mounting section. The central flange can have a constant width and the height of the webs can be constant through the mounting section. Both the width of the flange and the height of the webs may, however, vary along the mounting section.

The central flange of respective sections should preferably lie in one and the same plane, whereas the side-flanges should lie in different planes which are inclined relative to one another in correspondence with the decreasing height of the bar towards said one bar end. It also lies within the purview of the present invention, however, for the side-flanges in respective sections to lie in one and the same plane, while the central flange of respective sections is located in different planes corresponding to the decreasing height of said flanges towards said bar end. The webs will preferably, have substantially the same height on both sides of the bar, although webs of different heights also lie within the purview of the invention, so that the side-flanges will be located in different planes. The central flanges may also slope on both long sides of the safety bar, preferably by giving the bar web on one long side a smaller height than the one the other long side when the side-flanges are located in one and the same plane.

Since the cross section of the mounting section has a central flange and webs, the safety bar according to the present invention has a capacity to take up bending moments also in the joint to the vehicle which results in a higher energy absorption capacity of the bar and its joint as compared to for example the safety bar described in SE-C-501812. Further details and characteristics of the safety beam according to the present invention will be obvious from the description of the figures.

Further details and characteristic features of the inventive safety bar will be evident from the following description made with reference to the accompanying drawings.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention will now be described with reference to the accompanying drawings, wherein.

DESCRIPTION OF THE PREFERRED EMBODIMENT

Figure 1:
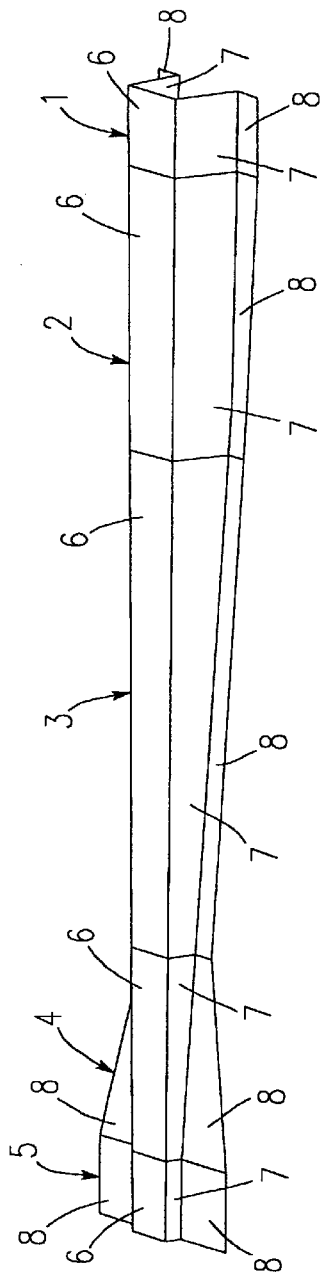
FIG. 1 is a perspective side view of an inventive safety bar, as seen in a direction towards its load absorbing side.
Figure 2:
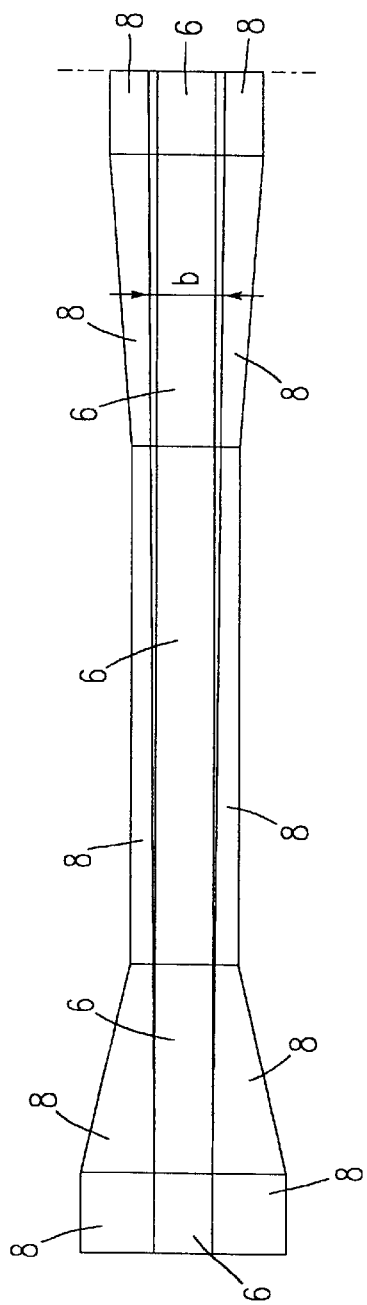
FIG. 2 is a view of the safety bar shown in FIG. 1 as seen towards its load-absorbing side.
Figure 3:
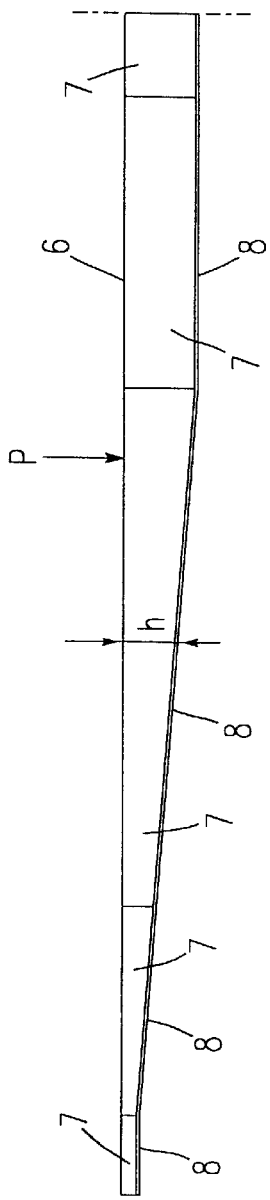
FIG. 3 illustrates the safety bar shown in FIGS. 1 and 2 as seen from one long side of the bar.

The safety bar illustrated in FIGS. 1–3 is substantially symmetric about a first central section 1, although the Figures illustrate solely that part of the bar which extends from one end thereof and slightly into the first section 1 at the center of the bar. The bar has a generally uniform trapezoidal cross–section and can include, proximal to the first section 1, on both sides thereof, a second section 2 of constant height (h) and having a width (b) which decreases towards respective ends of the bar. Provided adjacent respective second sections 2 is a third section 3 of constant width (b) but whose height (h) decreases towards respective ends of the bar. Respective third sections 3 are terminated at respective bar ends by a fourth section 4 of constant width (b) and a height (h) which decreases towards said bar end. Respective fourth sections 4 carry a mounting part 5 by means of which the safety bar can be fitted to a vehicle, for instance, in the sides or doors of the vehicle.

The trapezoidal cross-sectional shape of the safety bar in the first section 1 will be evident from FIG. 1, from which it will also be seen that the bar includes a central flange 6 which flange is embraced by two webs 7 of substantially equal height. Each web 7 connects with an outwardly directed side-flange 8 on each side thereof, said two side-flanges 8 being located in substantially the same plane. Respective webs 7 slope at an angle (v) to the vertical to the plane extending through the side-flanges 8, so that the central flange 6 will have a width (b) which is smaller than the distance between the inner edges of the side-flanges 8. In the illustrated case, the web 7 slopes at an angle (v) of about 5°, although this angle may be about 0–10°.

The cross-section of the safety bar in the second section 2 includes a central flange 6 which is of constant height (h) and whose width (b) decreases towards the end of the bar. In this case, the angle (v) at which the web 7 slopes is constant and is equal to the slope angle in the first section 1. The width (c) of the side-flanges 8 decreases in a direction towards the bar end. In the illustrated case, this decrease is about 33% of the width applicable to the first section 1. However, the width (c) of the side-flanges 8 may decreases by up to 60% of the width (c) applicable to the first section 1. In the illustrated case, the width (b) of the central flange 6 decreases by about 35% of the width (b) applicable to the first section 1. The central flange 6 in the second section 2, however, is located in the plane which extends through the central flange 6 in the first section 1. According to an alternative embodiment of the inventive safety bar, the first section 1 can be omitted, in which case the two second bar sections 2 will be connected to each another at their respective ends of greatest cross-section.

The cross-sectional configuration of the safety bar in the third bar section 3 includes a central flange 6 of constant width (b) and a height (h) which decreases towards the end of the bar. The central flange 6 of the third section 3, is located in the plane that passes through the central flange 6 in the second bar section 2. In the illustrated embodiment, the height (h) decreases by about 50% from the height applicable to the second section 2. In this case, the web 7 slopes at the same angle (v) as in the first section 1 and the second section 2. The width (c) applicable to the second bar section 2. The decrease in height (h) can be more or less than the indicated 50% in other possible embodiments of the present invention.

The cross-sectional configuration of the bar in the fourth section 4 includes a central flange 6 of constant width (b) and a height (h) which decreases. The width (b) of the central flange is equal to the width of the flange in the third section 3. The central flange of the fourth section 4 is located in the plane that passes through the central flange 6 in the third section 3 and the height (h) decreases from the smaller height (h) applicable to the third section 3 down to the height of the beginning of the mounting section 5. The width of the side-flanges 8 increases towards the end of the bar. In the illustrated embodiment, this increase is about 300% from the width applicable to the third section 3, so that the combined widths (b and c) of the central flange and the two side-flanges 8 will equal the width of the mounting part 5.

The central flange 6 of the mounting section 5 has a constant width (b) and a constant height (h). The width of the central flange (b) is the same as the one in the fourth section 4. The two side flanges 8 are part of the joints of the bar to the vehicle.

To further explain, FIGS. 1–3 show a bar that has a central portion or section 6. Two flank portions 7 are positioned along opposing sides of the central portion 6. The flank portions 7 are substantially transverse to and form a substantial angle with the central portion 6. Two side flanges 8 are also shown. The side flanges 8 are disposed one each along the two flank portions 7, opposite the sides of the flank portions 7 adjacent the central portion 6. The side flanges 8 are substantially transverse to and form a substantial angle with their corresponding flank portions 7. The central section 6, the flank portions 7 and the side flanges 8 together define an open profile of the bar, which open profile can be essentially hat-shaped in at least one embodiment. The bar has a rear fastening section 5, which is configured to be connected to a rear portion of an automobile (not shown). As can be seen in FIGS. 1 and 3, the open profile continues throughout, over and to the end of the rear fastening section 5.

The webs 7 in the various bar sections may slope at different angles along the length of the bar, both between respective sections and within one and the same section.

Because the central flange 6 of respective bar section and the bar mounting sections 5 lie in the same plane, the illustrated safety bar can obtain a substantially flat load-absorbing side. When the safety bar is subjected to load acting in the direction of the arrow (P) in FIG. 3, for instance when the vehicle is subjected to impact forces on the side thereof in which the inventive safety bar is mounted, the central flange 6 is subjected to pressure forces along the length of the bar while the side-flanges 8 are subjected to tension forces. The profiled mounting section 5 results in that the safety bar according to the invention will have the ability to take up bending moments also in the mounting section 5.

Figure 6:
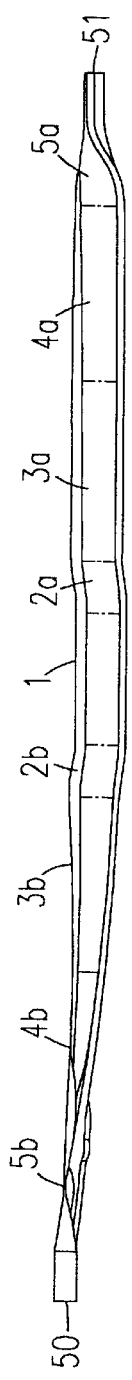
FIG. 6 illustrates a view of the saftety bar as seen in FIGS. 8 and 9 as seen from one long side of the bar.

FIG. 6 is a diagram that illustrates a comparison between safety bars of different designs. The diagram shows the energy absorption capacity In J/kg of each bar.

Figure 4:
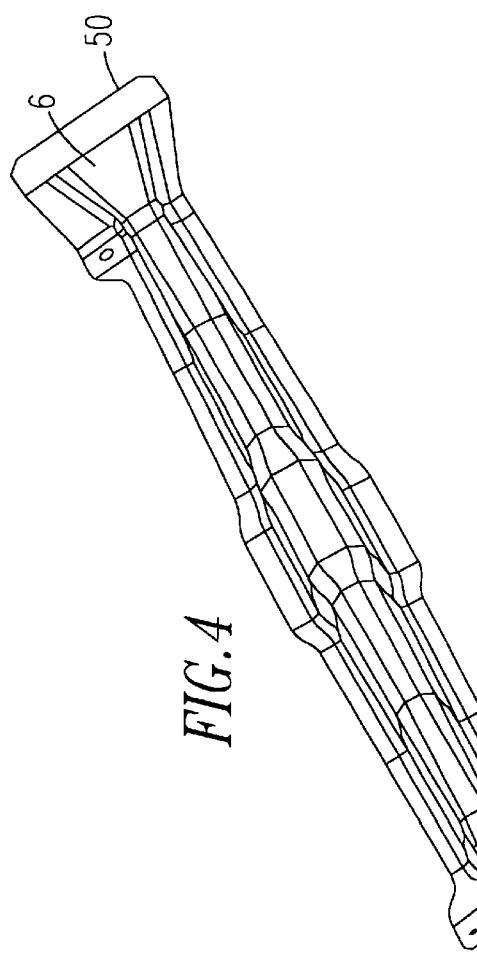
FIG. 4 illustrates an isometric view of an embodiment of a safety bar according to at least one embodiment of the present invention.
Figure 5:
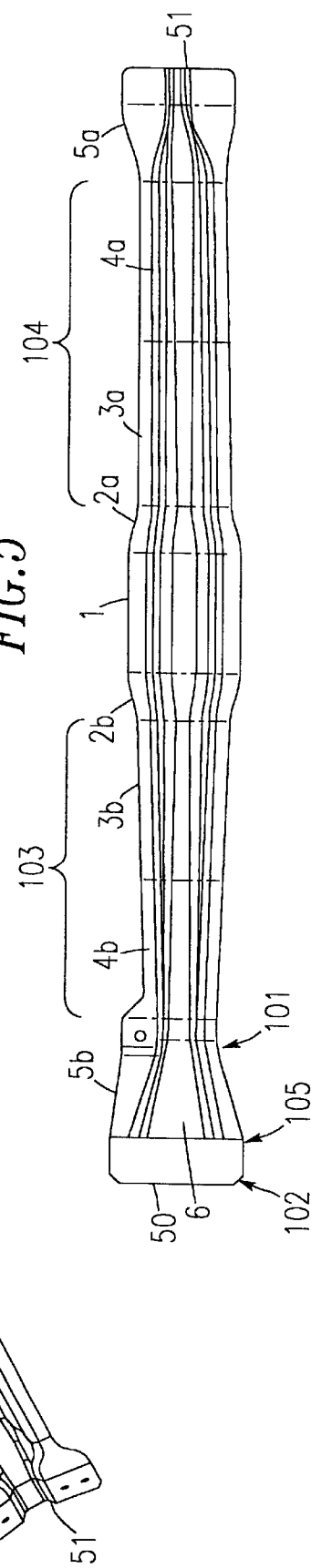
FIG. 5 illustrates a side view of the embodiment of the present invention as shown in FIG. 8.

FIGS. 4, 5 and 6 show views of a side collision protection beam according to at least one embodiment of the present invention. The beam has an open profile comprising the central portion 6, flank portions 7, and side flanges 8 as described above and shown in FIGS. 1–3. A rear fastening section 5a and a front fastening section 5b are positioned at opposite ends of the beam 50 and 51, respectively, which ends are asymmetrical with respect to each other. The front fastening section 5b is configured to connect to a front portion of an automobile door. The front fastening section 5b has a first end 101 and a second end 102. As shown in FIGS. 4 and 5, the open profile terminates a distance away from and prior to the second end 102 of the front fastening section 5b, which termination point is designated 105. In contrast, the open profile continues throughout and to the end of the rear fastening section 5a.

Further, the beam has a front portion 103 and a rear portion 104, which portions are asymmetrical with respect each other. The front portion 103 comprises sections 3b and 4b. The rear portion 104 comprises sections 3a and 4a. In at least one embodiment of the present invention, the rear portion 104 can have a substantially constant height over the length of sections 3a and 4a, while the front portion 103 can have a slowly decreasing height over the length of sections 3b and 4b toward the front end of the beam 50, as shown in FIG. 6.

The beam has a central region 1 disposed between the front portion 103 and the rear portion 104. On either side of the central region 1 are disposed first intermediate portion 2b and a second intermediate portion 2a. The first intermediate portion 2b and the second intermediate portion 2a are disposed between the central region 1 and the front portion 103 and the rear portion 104 respectively. Each of the intermediate portions 2a, 2b have a substantially constant height, but a greatly decreasing width.

FIG. 6 shows a side view of the beam shown in FIGS. 4 and 5. As can be seen in the figure, the central region 1 has a substantially constant height which is greater than the height in any other section of the beam.

Additionally, the central portion 6 is narrower at the first end 101 of the front fastening section 5b than at the termination point 105 as shown in FIG. 5. European Patent No. 0 685 355 A1 and Federal Republic of Germany Patent Applications No. 44 18 805 and 44 25 572, are hereby incorporated by reference as if set forth in their entirety herein.

It should be understood that in various possible embodiments of the present invention, the design of the bar can be varied by the omittance of some of the bar sections.

It should also be understood that the invention is not restricted to the illustrated and described embodiments thereof and that changes and modifications are conceivable within the scope of the following claims.

The present invention relates to a bar intended as a vehicle-mounted safety bar, which provides protection in the event of collisions, in particular side collisions, the bar having a generally trapezoidal, open cross-sectional shape. The cross-sectional configuration of the bar includes a central flange which is embraced by two webs each of which has a side-flange which extends outwardly on a respective side of the bar. The bar has an intermediate section between a first section thereof and a mounting section thereof at one of its end. In the intermediate section, the central flange has generally a decreasing width and the webs a generally decreasing height towards the bar end.

Safety bars are known from various applications although the use of such bars as collision protection in vehicles is the most usual. Another common application is the use as barriers along highways and roads to prevent vehicles from running off the road in the event of accidents.

A vehicle-mounted safety bar which is intended to counteract side-on collisions is known from Swedish Patent Specification SE-C-501812. As described in that patent specification, the safety bar has an open cross-section, which results in low production costs and also in lower costs for corrosion protection and the like at the same time as it results in a good energy absorbing capacity in relation to the weight of the bar. The safety bar according to the present invention is an improvement of the safety bar described in SE-C-501812 and the like safety bars.

An object of the present invention is to provide a bar structure which is particularly but not exclusively intended as a vehicle-mounted safety bar for protection against side-on collisions and which has a generally trapezoidal, preferably open cross-section and which has a higher energy absorbing capacity than for example the safety bar according to SE-C-501812.

The cross-section of the safety bar according to the present invention comprises a central flange which is embraced by two webs with outwardly directed side flanges. The bar has an intermediate section between a first section and a mounting section at one end of the beam, and towards the bar end, the central flange has generally a decreasing width and the webs generally a decreasing height. The inventive safety bar may include a first section of constant cross-section located in the center part of the bar, from which the bar tapers outwardly towards its its ends. It lies within the purview of the invention, however, to omit this central first section, in which case the bar will taper towards its respective ends directly from the midway point of the bar. A one-sided bar lies also within the purview of the invention, by which is meant a bar which tapers from a larger cross-section out towards a narrower cross-section, or tapers asymmetrically, towards respective ends thereof. The intermediate section can be divided into section parts. The central flange can for example in a first part of the intermediate section have its width considerably reduced while the height of the webs is not reduced at all or reduced at a smaller extent whereas the height of the webs can be reduced considerably in a second part of the intermediate section, while the width of the central flange is reduced at a smaller extent or not at all. It is advantageous to have said second part of the intermediate section located between said first part and the bar end.

The central flange may have a central channel that can be shallow or deep. It can for example extend down to the plane through the side flanges. The cross-section of the bar need not be directly trapezoidal with sharp corners but may be somewhat rounded.

The safety beam according to the invention is characterized in that the central flange extends substantially through the mounting section. The central flange can have a constant width and the height of the webs can be constant through the mounting section. Both the width of the flange and the height of the webs may, however, vary along the mounting section.

The central flange of respective sections should preferably lie in one and the same plane, whereas the side-flanges should lie in different planes which are inclined relative to one another in correspondence with the decreasing height of the bar towards said one bar end. It also lies within the purview of the invention, however, for the side-flanges in respective sections to lie in one and the same plane, while the central flange of respective sections is located in different planes corresponding to the decreasing height of said flanges towards said bar end. The webs will, preferably, have the same height on both sides of the bar, although webs of different heights also lie within the purview of the invention, so that the side-flanges will be located in different planes. The central flanges may also slope on both long sides of the safety bar, preferably by giving the bar web on one long side a smaller height than the one the other long side when the side-flanges are located in one and the same plane.

Since the cross section of the mounting section has a central flange and webs, the safety bar according to the invention has a capacity to take up bending moments also in the joint to the vehicle which results in a higher energy absorption capacity of the bar and its joint as compared to for example the safety bar described in SE-C-501812.

One feature of the invention resides broadly in a bar, particularly but not exclusively intended as a vehicle-mounted safety bar which provides protection in the event of side collisions. having a generally trapezoidal, open cross-section that includes a central flange 6 embraced by two webs 7 with outwardly directed side flanges 8, wherein the bar has an intermediate section 2, 3 between a first section 1 and a mounting section 5 at one end of the beam. and in the intermediate section, the central flange 6 has generally a decreasing width and the webs generally a decreasing height towards the bar end characterized in that the central flange extends substantially through the mounting section 5.

Another feature of the invention resides broadly in a bar characterized in that the central flange 6 of the mounting section 5 has webs with substantially constant height h.

Yet another feature of the invention resides broadly in a bar characterized in that the central flange 6 of the mounting section 5 has webs with a height that decrease towards the bar end.

Still another feature of the invention resides broadly in a bar characterized in that the central flange 6 of the mounting section 5 has substantially a constant width.

A further feature of the invention resides broadly in a bar characterized in that the side flanges 8 are in the same plane.

Another feature of the invention resides broadly in a bar characterized in that the central flange 6 is in the same plant along its entire length.

Yet another feature of the invention resides broadly in a bar characterized in that the bar is substantially symmetrically extending from said first section 1 towards both ends.

Still another feature of the invention resides broadly in a bar characterized in that the intermediate section 2, 3 has a first section 2 in which the width of the central flange decreases but the height of the webs is constant or decreases only at a smaller extent and a second section 3 in which the height of the webs decreases but the width of the central flange is constant or decreases only at a smaller extent.

A further feature of the invention resides broadly in a bar characterized in that the second section 3 of the intermediate section is located between the first section 2 of the intermediate section and the mounting section 5.

A side collision protection beam for an automobile door, incorporating an open profile with two flanks which meet or connect to a middle flange situated between the two, and side flanges which terminate at the flanks, the beam ends at the ends with fastening sections, characterized by the profile continuing over the rear fastening section but not over the front fastening section.

A side collision protection beam characterized by the beam being asymetrical, and from the center having a part pointing to the rear which is heavier (stiffer flexural strength) than the part pointing forward.

A side collision protection beam characterized by the portion pointing forward from the center portion on having reduced flexural stiffness.

A side collision protection beam characterized by short sections with rapidly diminishing stiffness and which connects to the central portion on both sides thereof.

A bar, particularly but not exclusively intended as a vehicle-mounted safety bar which provides protection in the event of side collisions, having a generally trapezoidal, open cross-section that includes a central flange (6) embraced by two webs (7) with outwardly directed side flanges (8). wherein the bar has an intermediate section (2, 3) between a first section (1) and a mounting section (5) at one end of the beam. and in the intermediate section. the central flange (6) has generally a decreasing width and the webs generally a decreasing height towards the bar end characterized in that the central flange extends substantially through the mounting section.

A bar characterized in that the central flange (6) of the mounting section (5) has webs with substantially constant height (h).

A bar characterized in that the central flange (6) of the mounting section (5) has webs with a height that decrease towards the bar end.

A bar characterized in that the central flange (6) of the mounting section (5) has substantially a constant width.

A bar characterized in that the side flanges (8) are in the same plane.

A bar characterized in that the central flange (6) is in the same plant along its entire length.

A bar characterized in that the bar is substantially symmetrically extending from said first section (1) towards both ends.

A bar characterized in that the intermediate section (2, 3) has a first section (2) in which the width of the central flange decreases but the height of the webs is constant or decreases only at a smaller extent and a second section (3) in which the height of the webs decreases but the width of the central flange is constant or decreases only at a smaller extent.

A bar characterized in that said second section (3) of the intermediate section is located between said first section (2) of the intermediate section and the mounting section (5).

Examples of safety bars, and components thereof, which may be used in embodiments of the present invention, may be found in the following U.S. Patents, which are hereby incorporated by reference as if set forth in their entirety herein: U.S. Pat. No. 4,641,872, issued Feb. 10, 1987 to Lohr et al.; U.S. Pat. No. 5,093,990, issued Mar. 10, 1992 to Klippel; U.S. Pat. No. 5,277,469, issued Jan. 11, 1994 to Klippel; U.S. Pat. No. 5,125,251, issued Jun. 30, 1992 to Pettersson et al.; and U.S. Pat. No. 5,256,219, issued Oct. 26, 1993 to von Hagen et al.

The following patents and patent publications, which may contain components which may be incorporated in embodiments of the present invention, are hereby expressly incorporated by reference herein: WO 94/07709 A1, issued Apr.

14, 1994; No. EP 0 685 355 A1, issued Dec. 6, 1995; U.S. Pat. No. 4,796,946, issued Jan. 10, 1989; U.S. Pat. No. 5,232,261, issued Aug. 3, 1993; Federal Republic of Germany No. DE 19 59 988, issued Apr. 3, 1975; and Japan Patent Abstract JP A 63-215,419, issued Sep. 7, 1988.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Sweden Patent Application No. 9601246-3, filed on Apr. 1, 1996, having inventors Stefan Hortlund and Lars Sandberg, and laid-open Sweden Patent Application No. 9601246-3 and Sweden Patent No. 9601246-3 and International Application No. PCT/SE97/00535, filed on Mar. 26, 1997, and International Publication No. WO 97/36761, published Oct. 9, 1997, as well as their published equivalents, and other equivalents or corresponding applications, if any, in corresponding cases in Sweden and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A side collision protection beam for an automobile door comprising:

a central portion having a length and a width and defining a longitudinal direction along said length;

two flank portions;

said two flank portions being disposed in the longitudinal direction, one each on opposite sides of said central portion;

said two flank portions being disposed substantially transverse to said central portion and to form a substantial angle with said central portion;

two side flanges;

said two side flanges being disposed one each along said two flank portions, opposite the sides of said flank portions adjacent said central portion;

said two side flanges being disposed substantially transverse to their corresponding flank portions and to form a substantial angle with their corresponding flank portions;

said two side flanges, said two flank portions and said central portion being configured and disposed to form an open profile;

a front fastening section being configured to connect to a front portion of an automobile door;

a rear fastening section being configured to connect to a rear portion of an automobile door;

said front and rear fastening sections being disposed at opposite ends of said beam;

said open profile of said beam continues along and to the end of said rear fastening section;

said front fastening section having a first end disposed adjacent said central portion, and a second end disposed opposite said first end; and said open profile terminates a distance away from and prior to the second end of said front fastening section.

2. The beam according to claim 1 wherein:

said beam comprises a front portion and a rear portion;

said front portion is disposed nearer said front fastening section than said rear portion;

said rear portion is disposed nearer said rear fastening section than said front portion; and said front portion and said rear portion of said beam are asymmetrical, one with respect to the other.

3. The beam according to claim 2 wherein:

said rear portion of said beam has a substantially constant height;

said front portion of said beam has a decreasing height which decreases toward said front fastening section; and said height of said rear portion is greater than said height of said front portion.

4. The beam according to claim 3 wherein:

said beam comprises a central region;

said central region is disposed between said front portion and said rear portion; and said height of said front portion decreases from said central region forward.

5. The beam according to claim 4 wherein:

said beam comprises a first intermediate portion, said first intermediate portion being disposed between said central region and said front portion; and said first intermediate portion rapidly diminishes in width away from said central region.

6. The beam according to claim 5 wherein:

said beam comprises a second intermediate portion, said second intermediate portion being disposed between said central region and said rear portion; and said second intermediate portion rapidly diminishes in width away from said central region.

7. The beam according to claim 6 wherein:

said front fastening section comprises a termination point, at which point the open profile terminates; and said central portion is narrower at said first end of said front fastening section than at said termination point of said open profile.

8. The beam according to claim 7 wherein:

said beam has a height, the height of said beam corresponds to the height of said profile; and said height of said beam is greater in said central region than in either of said front and rear fastening sections.

9. The beam according to claim 8 wherein:

said front fastening section is substantially flat with respect to said profile;

said central region has a substantially constant height;

said width of said central portion is substantially constant in said central region;

said side flanges are coplanar with one another; and said central portion is substantially planar along its entire length.

* * * * *

UNITED STATES PATENT AND TRADEMARK OFFICE
CERTIFICATE OF CORRECTION

PATENT NO.    : 6,290,282 B1
DATED         : September 18, 2001
INVENTOR(S)   : Stefan Hortlund and Lars Sandberg It is certified that error appears in the above-identified patent and that said Letters Patent is hereby corrected as shown below:

Column 3,
Line 16, after 'the', delete "saftety" and insert -- safety --.

Column 7,
After line 65, insert the following paragraph:

-- One feature of the invention resides broadly in a beam comprising: a central section, said central section having a length and a width; said central section having two opposing sides, said two sides being disposed along said length of said central section; first and second flank portions; said first and second flank portions being disposed along said opposite sides of said central section; each of said first and second flank portions forming a substantial angle with respect to said central section; first and second side flanges; said first side flange being disposed along the other side of said first flank portion from said central section; said second side flange being disposed along the other side of said second flank portion from said central section; said first side flange forming a substantial angle with respect to said first flank portion; said second side flange forming a substantial angle with respect to said second flank portion from said central section having first and second ends, said first and second ends being disposed at opposite ends of the length of said central section from one another; a first fastening portion and a second fastening portion; said first fastening portion being disposed at a first end of said beam and said second fastening portion being disposed at a second end of said beam; said first fastening portion being configured to be disposed at the front of an automobile door; said second fastening portion being configured to be disposed at the rear of an automobile door; said central section, said flank portions and said flanges define a profile of said beam; said profile of said beam continuing over said second fastening portion; said first fastening portion having a first end adjacent to said central section and a second end disposed opposite said first end; and said profile of said beam terminating a distance from and prior to said second end of said first fastening portion.

UNITED STATES PATENT AND TRADEMARK OFFICE
CERTIFICATE OF CORRECTION

| | | |
|---|---|---|
| PATENT NO. | : 6,290,282 B1 | |
| DATED | : September 18, 2001 | |
| INVENTOR(S) | : Stefan Hortlund and Lars Sandberg | |

It is certified that error appears in the above-identified patent and that said Letters Patent is hereby corrected as shown below:

Another feature of the invention resides broadly in a side collision protection beam for an automobile door comprising: a central portion having a length and a width and defining a longitudinal direction along said length; two flank portions; said two flank portions being disposed in the longitudinal direction, one each on opposite sides of said central portion; two side flanges; said two side flanges being disposed one each along said two flank portions, opposite the sides of said flank portions adjacent said central portion; said two side flanges, said two flank portions and said central portion being configured and disposed to form an open profile; a front fastening section being configured to connect to a front portion of an automobile door; a rear fastening section being configured to connect to a rear portion of an automobile door; said front and rear fastening sections being disposed at opposite ends of said beam; said open profile of said beam continues along said rear fastening section; said front fastening section having a first end disposed adjacent said central portion, and a second end disposed opposite said first end; and said open profile terminates a distance away from and prior to the second end of said front fastening section.

Yet another feature of the invention resides broadly in a beam wherein: said beam comprises a front portion and a rear portion said front portion is disposed nearer said front fastening portion than said rear portion; said rear portion is disposed nearer said rear fastening section than said front portion; and said front portion and said rear portion of said beam are asymmetrical, one with respect to the other.

Still another feature of the invention resides broadly in a beam wherein said rear portion of said beam has a stiffer flexural strength than said front portion of said beam.

A further feature of the invention resides broadly in a beam wherein: said beam comprises a central region; said central region is disposed between said front portion and said rear portion; and said front portion has reduced flexural stiffness from said central region forward.

Another feature of the invention resides broadly in a beam wherein: said beam comprises a first intermediate portion, said first intermediate portion being disposed between said central region and said front portion; and said first intermediate portion is disposed and configured to rapidly diminish in stiffness away from said central region.

UNITED STATES PATENT AND TRADEMARK OFFICE
CERTIFICATE OF CORRECTION

PATENT NO. : 6,290,282 B1
DATED : September 18, 2001
INVENTOR(S) : Stefan Hortlund and Lars Sandberg It is certified that error appears in the above-identified patent and that said Letters Patent is hereby corrected as shown below:

Yet another feature of the invention resides broadly in a beam wherein: said beam comprises a second intermediate portion, said second intermediate portion being disposed between said central region and said rear portion; and said second intermediate portion is disposed and configured to rapidly diminish in stiffness away from said central region.

Still another feature of the invention resides broadly in a beam wherein: said front fastening section comprises a front mounting plate; said front mounting plate has a first end disposed toward said central region and a second end disposed opposite said first end; and said central portion is narrower at said first end of said front mounting plate than at said second end of said front mounting plate.

A further feature of the invention resides broadly in a beam wherein: said beam has a height, the height of said beam corresponds to the height of said profile; and said height of said beam is greater in said central region than in either of said front and rear fastening sections.

Another feature of the invention resides broadly in a beam wherein: said front fastening section is substantially flat with respect to said profile; said central region has a substantially constant height; said width of said central portion is substantially constant in said central region; said side flanges are coplanar with one another; and said central portion is substantially planar along its entire length.

Yet another feature of the invention resides broadly in a bar having a generally trapezoidal, open cross-section, the cross-section comprising a central flange embraced by two webs with outwardly directed side flanges, wherein the bar has an intermediate section between a first section and a mounting section at one end of the beam, and in the intermediate section, the central flange has generally a decreasing width and the webs generally a decreasing height towards the bar end wherein the central flange extends substantially through the mounting section.

UNITED STATES PATENT AND TRADEMARK OFFICE
CERTIFICATE OF CORRECTION

PATENT NO.   : 6,290,282 B1
DATED        : September 18, 2001
INVENTOR(S)  : Stefan Hortlund and Lars Sandberg It is certified that error appears in the above-identified patent and that said Letters Patent is hereby corrected as shown below:

Still another feature of the invention resides broadly in a bar wherein: the central flange of the mounting section has webs with substantially constant height; the central flange of the mounting section has webs with a height that decrease towards the bar end; the central flange of the mounting section has substantially a constant width; the side flanges are in the same plane; the central flange is in the same plant along its entire length; the bar is substantially symmetrically extending from said first section towards both ends; the intermediate section has a first section in which the width of the central flange decreases but the height of the webs is constant or decreases only at a smaller extent and a second section in which the height of the webs decreases but the width of the central flange is constant or decreases only at a smaller extent; and the second section of the intermediate section is located between said first section of the intermediate section and the mounting section. --

Signed and Sealed this

Twenty-eighth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,290,282 B1
DATED        : September 18, 2001
INVENTOR(S)  : Stefan Hortlund and Lars Sandberg It is certified that error appears in the above-identified patent and that said Letters Patent is hereby corrected as shown below:

<u>Column 3,</u>
Line 16, after 'the', delete "saftety" and insert -- safety --.

<u>Column 7,</u>
After line 65, insert the following paragraph:

-- One feature of the invention resides broadly in a beam comprising: a central section, said central section having a length and a width; said central section having two opposing sides, said two sides being disposed along said length of said central section; first and second flank portions; said first and second flank portions being disposed along said opposite sides of said central section; each of said first and second flank portions forming a substantial angle with respect to said central section; first and second side flanges; said first side flange being disposed along the other side of said first flank portion from said central section; said second side flange being disposed along the other side of said second flank portion from said central section; said first side flange forming a substantial angle with respect to said first flank portion; said second side flange forming a substantial angle with respect to said second flank portion; said central section having first and second ends, said first and second ends being disposed at opposite ends of the length of said central section from one another; a first fastening portion and a second fastening portion; said first fastening portion being disposed at a first end of said beam and said second fastening portion being disposed at a second end of said beam; said first fastening portion being configured to be disposed at the front of an automobile door; said second fastening portion being configured to be disposed at the rear of an automobile door; said central section, said flank portions and said flanges define a profile of said beam; said profile of said beam continuing over said second fastening portion; said first fastening portion having a first end adjacent to said central section and a second end disposed opposite said first end; and said profile of said beam terminating a distance from and prior to said second end of said first fastening portion.

UNITED STATES PATENT AND TRADEMARK OFFICE
CERTIFICATE OF CORRECTION

PATENT NO. : 6,290,282 B1
DATED : September 18, 2001
INVENTOR(S) : Stefan Hortlund and Lars Sandberg It is certified that error appears in the above-identified patent and that said Letters Patent is hereby corrected as shown below:

Another feature of the invention resides broadly in a side collision protection beam for an automobile door comprising: a central portion having a length and a width and defining a longitudinal direction along said length; two flank portions; said two flank portions being disposed in the longitudinal direction, one each on opposite sides of said central portion; two side flanges; said two side flanges being disposed one each along said two flank portions, opposite the sides of said flank portions adjacent said central portion; said two side flanges, said two flank portions and said central portion being configured and disposed to form an open profile; a front fastening section being configured to connect to a front portion of an automobile door; a rear fastening section being configured to connect to a rear portion of an automobile door; said front and rear fastening sections being disposed at opposite ends of said beam; said open profile of said beam continues along said rear fastening section; said front fastening section having a first end disposed adjacent said central portion, and a second end disposed opposite said first end; and said open profile terminates a distance away from and prior to the second end of said front fastening section.

Yet another feature of the invention resides broadly in a beam wherein: said beam comprises a front portion and a rear portion; said front portion is disposed nearer said front fastening portion than said rear portion; said rear portion is disposed nearer said rear fastening section than said front portion; and said front portion and said rear portion of said beam are asymmetrical, one with respect to the other.

Still another feature of the invention resides broadly in a beam wherein said rear portion of said beam has a stiffer flexural strength than said front portion of said beam.

A further feature of the invention resides broadly in a beam wherein: said beam comprises a central region; said central region is disposed between said front portion and said rear portion; and said front portion has reduced flexural stiffness from said central region forward.

Another feature of the invention resides broadly in a beam wherein: said beam comprises a first intermediate portion, said first intermediate portion being disposed between said central region and said front portion; and said first intermediate portion is disposed and configured to rapidly diminish in stiffness away from said central region.

UNITED STATES PATENT AND TRADEMARK OFFICE
CERTIFICATE OF CORRECTION

PATENT NO.   : 6,290,282 B1
DATED        : September 18, 2001
INVENTOR(S)  : Stefan Hortlund and Lars Sandberg It is certified that error appears in the above-identified patent and that said Letters Patent is hereby corrected as shown below:

Yet another feature of the invention resides broadly in a beam wherein: said beam comprises a second intermediate portion, said second intermediate portion being disposed between said central region and said rear portion; and said second intermediate portion is disposed and configured to rapidly diminish in stiffness away from said central region.

Still another feature of the invention resides broadly in a beam wherein: said front fastening section comprises a front mounting plate; said front mounting plate has a first end disposed toward said central region and a second end disposed opposite said first end; and said central portion is narrower at said first end of said front mounting plate than at said second end of said front mounting plate.

A further feature of the invention resides broadly in a beam wherein: said beam has a height, the height of said beam corresponds to the height of said profile; and said height of said beam is greater in said central region than in either of said front and rear fastening sections.

Another feature of the invention resides broadly in a beam wherein: said front fastening section is substantially flat with respect to said profile; said central region has a substantially constant height; said width of said central portion is substantially constant in said central region; said side flanges are coplanar with one another; and said central portion is substantially planar along its entire length.

Yet another feature of the invention resides broadly in a bar having a generally trapezoidal, open cross-section, the cross-section comprising a central flange embraced by two webs with outwardly directed side flanges, wherein the bar has an intermediate section between a first section and a mounting section at one end of the beam, and in the intermediate section, the central flange has generally a decreasing width and the webs generally a decreasing height towards the bar end wherein the central flange extends substantially through the mounting section.

UNITED STATES PATENT AND TRADEMARK OFFICE
CERTIFICATE OF CORRECTION

PATENT NO.     : 6,290,282 B1
DATED          : September 18, 2001
INVENTOR(S)    : Stefan Hortlund and Lars Sandberg It is certified that error appears in the above-identified patent and that said Letters Patent is hereby corrected as shown below:

Still another feature of the invention resides broadly in a bar wherein: the central flange of the mounting section has webs with substantially constant height; the central flange of the mounting section has webs with a height that decrease towards the bar end; the central flange of the mounting section has substantially a constant width; the side flanges are in the same plane; the central flange is in the same plant along its entire length; the bar is substantially symmetrically extending from said first section towards both ends; the intermediate section has a first section in which the width of the central flange decreases but the height of the webs is constant or decreases only at a smaller extent and a second section in which the height of the webs decreases but the width of the central flange is constant or decreases only at a smaller extent; and the second section of the intermediate section is located between said first section of the intermediate section and the mounting section. --

This certificate supersedes Certificate of Correction issued January 28, 2003.

Signed and Sealed this

Nineteenth Day of August, 2003

JAMES E. ROGAN
*Director of the United States Patent and Trademark Office*